(12) United States Patent
Kopp

(10) Patent No.: US 9,880,064 B2
(45) Date of Patent: Jan. 30, 2018

(54) MEASURING ARRANGEMENT WITH A CERAMIC MEASURING CELL

(71) Applicant: VEGA Grieshaber KG, Wolfach (DE)

(72) Inventor: Thomas Kopp, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 283 days.

(21) Appl. No.: 14/315,552

(22) Filed: Jun. 26, 2014

(65) Prior Publication Data

US 2015/0101415 A1    Apr. 16, 2015

(30) Foreign Application Priority Data

Oct. 14, 2013   (DE) .................. 10 2013 220 735

(51) Int. Cl.
| | |
|---|---|
| *G01L 9/00* | (2006.01) |
| *G01L 19/14* | (2006.01) |
| *G01L 7/08* | (2006.01) |
| *B23K 1/00* | (2006.01) |
| *B23K 1/19* | (2006.01) |
| *B23K 31/02* | (2006.01) |
| *C04B 37/00* | (2006.01) |

(52) U.S. Cl.
CPC ......... *G01L 9/0075* (2013.01); *B23K 1/0008* (2013.01); *B23K 1/19* (2013.01); *B23K 31/02* (2013.01); *C04B 37/005* (2013.01); *G01L 7/082* (2013.01); *G01L 19/147* (2013.01); *C04B 2237/10* (2013.01)

(58) Field of Classification Search
CPC ........................ G01L 9/0075; G01L 9/0055
See application file for complete search history.

(56) References Cited

U.S. PATENT DOCUMENTS

| | | | | |
|---|---|---|---|---|
| 4,670,733 | A | * 6/1987 | Bell | ........ G01L 13/025 338/36 |
| 4,898,035 | A | 2/1990 | Yajima et al. | |
| 6,122,976 | A | * 9/2000 | Hallberg | ........ C03C 27/044 73/756 |
| 2001/0015105 | A1 | * 8/2001 | Gerst | ........ G01L 9/0075 73/715 |
| 2002/0023499 | A1 | 2/2002 | Boehler et al. | |
| 2002/0040605 | A1 | * 4/2002 | Banholzer | ........ G01L 9/0075 73/715 |

(Continued)

FOREIGN PATENT DOCUMENTS

| | | |
|---|---|---|
| DE | 100 50 300 A1 | 10/2000 |
| DE | 10 2006 035 230 A1 | 1/2008 |

(Continued)

OTHER PUBLICATIONS

EPO Search Report dated Mar. 11, 2015 issued in Corresponding EP patent application No. 14172628.1.

*Primary Examiner* — Daniel J Colilla
(74) *Attorney, Agent, or Firm* — Juneau & Mitchell

(57) ABSTRACT

A measuring arrangement with a ceramic measuring cell and a metal process connection for connecting the measuring cell to a measuring environment, with the measuring cell being fastened in the process connection without gaskets and in a diffusion-resistant fashion, with the measuring cell being fastened at a ceramic ring, which is arranged at a metal ring for fastening in the process connection.

11 Claims, 3 Drawing Sheets

(56) References Cited

U.S. PATENT DOCUMENTS

| | | | | |
|---|---|---|---|---|
| 2008/0066555 A1* | 3/2008 | Rezgui | ............... | G01L 9/0055 73/716 |
| 2009/0301210 A1* | 12/2009 | Becher | ............... | G01L 9/0055 73/715 |
| 2012/0017691 A1* | 1/2012 | Ishihara | ............... | G01L 9/0042 73/724 |

FOREIGN PATENT DOCUMENTS

| | | | |
|---|---|---|---|
| EP | 0 735 353 A1 | | 10/1996 |
| EP | 1329960 A1 | | 10/2001 |
| EP | 1 329 960 A1 | | 7/2003 |
| JP | 07035634 A | * | 2/1995 |
| JP | 09210826 A | * | 8/1997 |
| WO | WO 2009 079 803 A1 | | 12/2008 |

\* cited by examiner

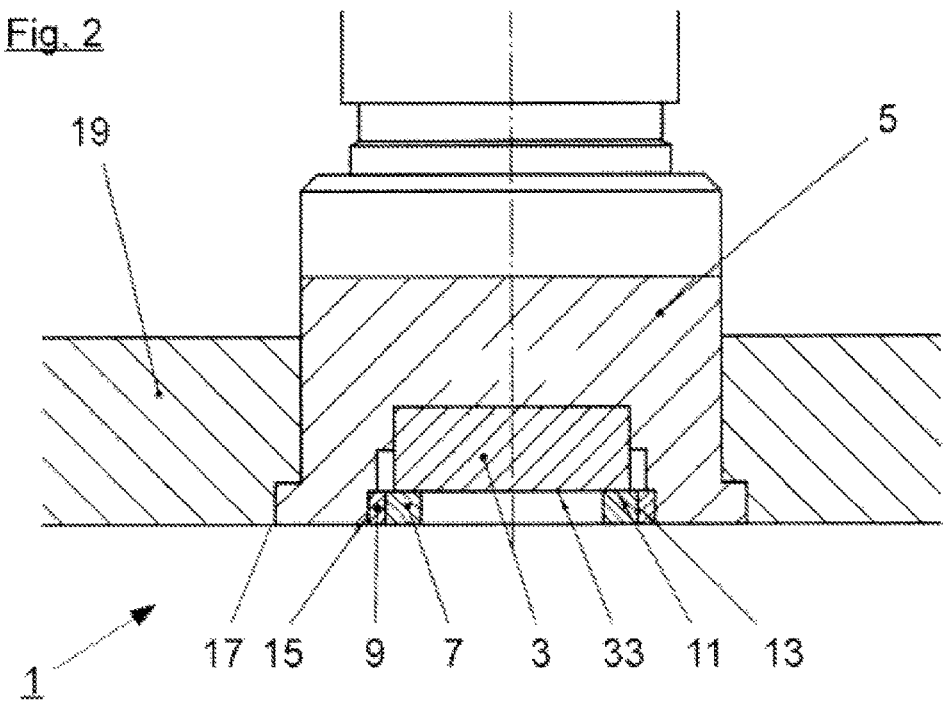
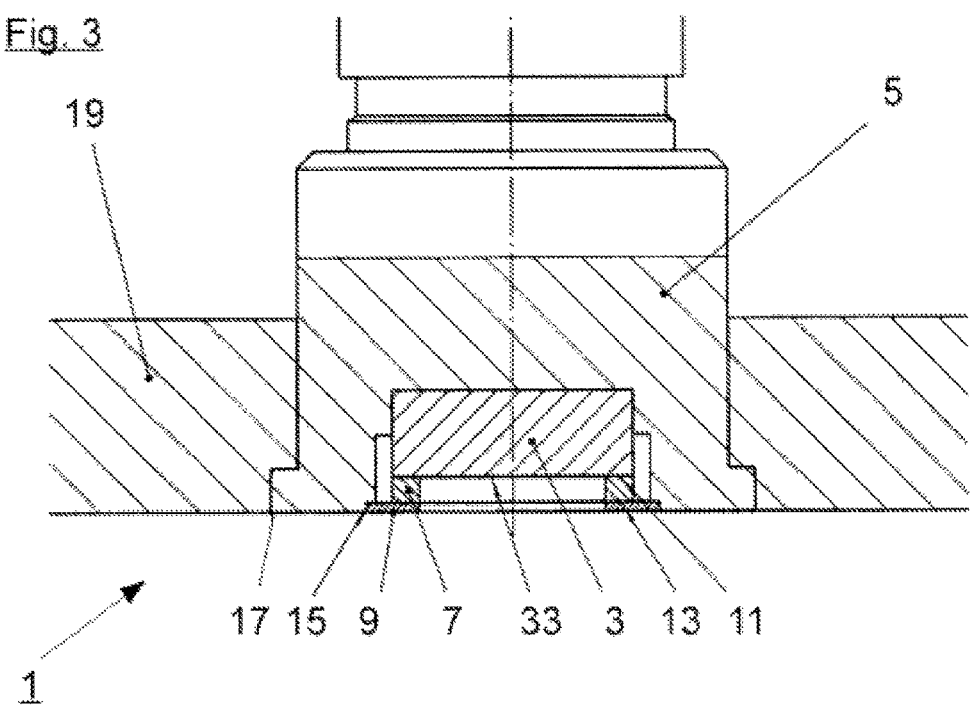

MEASURING ARRANGEMENT WITH A CERAMIC MEASURING CELL

CROSS REFERENCE TO RELATED APPLICATIONS

This patent application claims priority German Patent Application 10 2013 220 735.2, filed on Oct. 14, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a measuring arrangement with a ceramic measuring cell and a method of producing such arrangement.

Background of the Invention

The current state of knowledge is as follows.

Measuring arrangements with ceramic measuring cells are known from prior art, for example as pressure measuring arrangements with pressure sensors for measuring fill levels. Ceramic capacitive pressure measuring cells are used, which are arranged via an elastomer gasket in a process connection serving to arrange the pressure measuring cell in a process environment. Ceramic measuring cells are frequently used in applications in which hardness and robustness of ceramics are advantageous. Additionally, it is considered advantageous in ceramic pressure measuring cells that they may show a flat ceramic diaphragm, which on the one hand is resistant to abrasion and on the other hand can easily be cleaned.

In measuring arrangements known from prior art with ceramic measuring cells it is considered disadvantageous that the elastomer gaskets used are resistant to abrasion only to a limited extent and are subject to aging processes.

Additionally the elasticity of the elastomer gaskets used drops at low temperatures, with the result that, for example, at temperatures below −40° C., due to the reducing elasticity, oscillations of the fill level measuring device cannot be compensated any longer and here gaps can develop between the pressure measuring cell and the process connection. Another disadvantage of measuring arrangements with elastomer gaskets is the fact that in ultrapure applications, for example in the pharmaceutical or food sector, they can only be used to a limited extent, because either they are not licensed here or at least they require increased maintenance obligations for the user.

The objective of the present invention is to provide a further developed measuring arrangement with a ceramic measuring cell that avoids the disadvantages of the prior art.

This objective is attained in a measuring arrangement with the features disclosed herein.

BRIEF SUMMARY OF THE INVENTION

In a preferred embodiment, a measuring arrangement with a ceramic measuring cell and a metallic process connection for connecting a measuring cell to a measuring environment, wherein the measuring cell is fastened in the process connection without gaskets and in a diffusion-resistant fashion, and wherein the measuring cell is fastened at a ceramic ring, which is arranged at a metal ring for fastening in the process connection.

In another preferred embodiment, the measuring arrangement as described herein, wherein the measuring cell is embodied as a pressure measuring cell with a ceramic diaphragm.

In another preferred embodiment, the measuring arrangement as described herein, wherein the ceramic ring is fastened at the measuring cell with a solder connection.

In another preferred embodiment, the measuring arrangement as described herein, wherein the solder connection is generated with a hard solder or a glass solder.

In another preferred embodiment, the measuring arrangement as described herein, wherein the hard solder is a silver-based solder.

In another preferred embodiment, the measuring arrangement as described herein, wherein the metal ring is arranged radially in reference to the ceramic ring.

In another preferred embodiment, the measuring arrangement as described herein, wherein the metal ring is shrink-wrapped onto the ceramic ring.

In another preferred embodiment, the measuring arrangement as described herein, wherein the metal ring is arranged axially in reference to the ceramic ring.

In another preferred embodiment, the measuring arrangement as described herein, wherein the metal ring is connected with a hard solder connection to the ceramic ring.

In another preferred embodiment, the measuring arrangement as described herein, wherein the metal ring shows an interior diameter, which is equivalent to an interior diameter of the ceramic ring and shows an exterior diameter which is greater than an exterior diameter of the ceramic ring.

In another preferred embodiment, the measuring arrangement as described herein, wherein the hard solder connection is produced with a silver-based solder.

In another preferred embodiment, the measuring arrangement as described herein, wherein the ceramic ring is arranged with its front side at the measuring cell.

In another preferred embodiment, the measuring arrangement as described herein, wherein the ceramic ring and the measuring cell are made from the same material, preferably aluminum oxide.

In another preferred embodiment, the measuring arrangement as described herein, wherein the metal ring is made from titanium or a titanium alloy.

In another preferred embodiment, a method for producing a measuring arrangement of claim 1, comprising a first step (a) wherein the metal ring is connected to the ceramic ring and a second step (b) wherein the ceramic ring is fastened at the measuring cell.

In another preferred embodiment, the method as described herein, wherein the metal ring is soldered to the ceramic ring and/or the ceramic ring is glazed to the measuring cell.

In another preferred embodiment, the method as described herein, further comprising wherein the metal ring is fastened in a third step (c) in a process connection.

In another preferred embodiment, the method as described herein, wherein the fastening of step (c) is accomplished by welding.

BRIEF DESCRIPTION OF THE DRAWINGS

FIG. 2 is an enlarged detail of FIG. 1.
FIG. 3 is the view of FIG. 2 in an alternative embodiment.

DETAILED DESCRIPTION OF THE INVENTION

Figure 1:
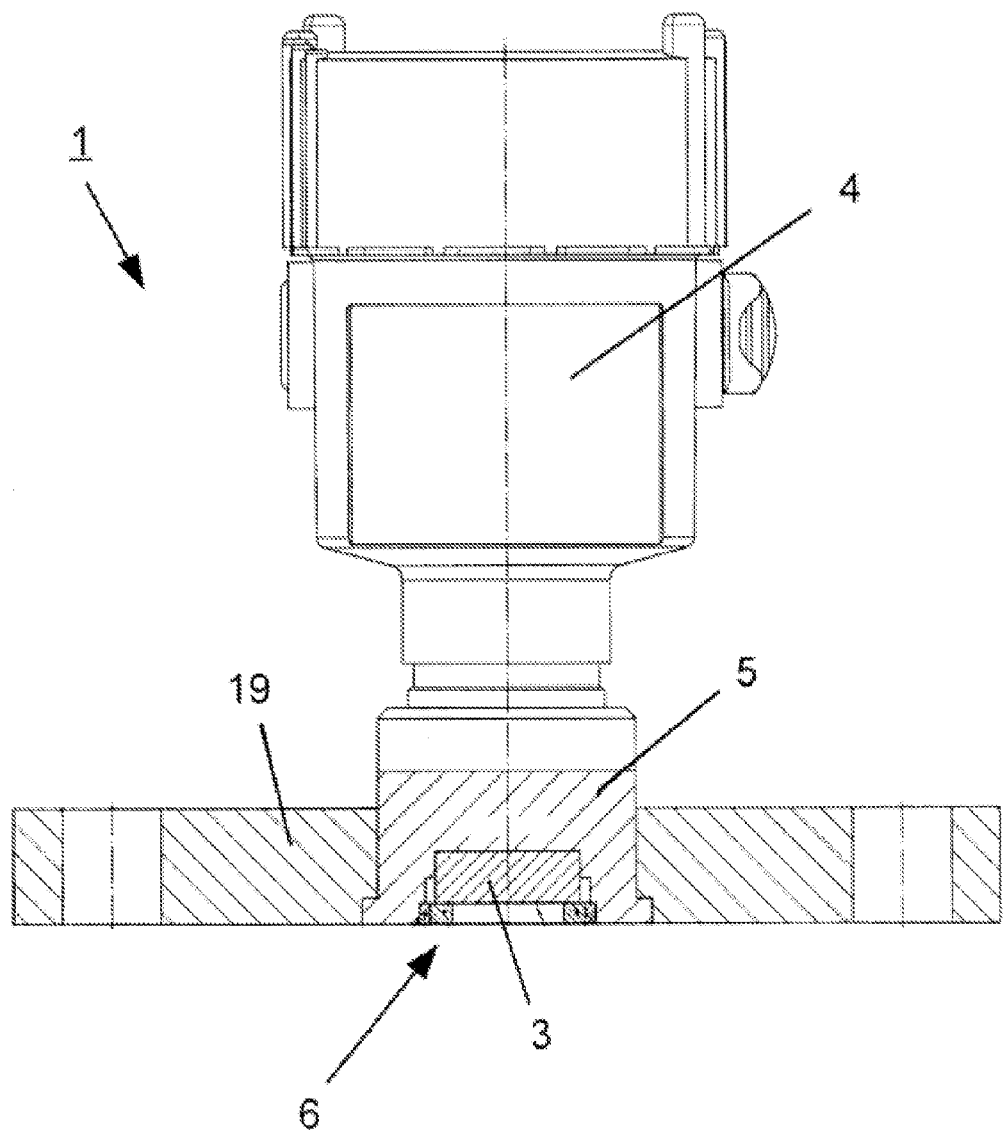
FIG. 1 is a schematic illustration of a measuring arrangement according to the invention.

The present invention relates to a measuring arrangement according to the invention with a ceramic measuring cell and a metallic process connection for connecting the measuring cell to a measuring environment, in which the measuring cell is fastened in the process connection without a gasket and in a diffusion-resistant fashion, and is characterized in that the measuring cell is fastened at a ceramic ring, which is arranged at a metal ring for fastening in a process connection. Gaskets in the sense of the present application are particularly understood as detachable sealing elements. They are commonly produced from elastomers and are held in a compressed fashion between two structural elements.

"Without gaskets" in the sense of the present application shall be understood particularly as the omission of the use of polymer layers contacting the processing medium.

An arrangement of the measuring cell at the process connection therefore represents that it is in a direct contact with a processing medium and not, as known from prior art for example, shielded by a pressure medium.

It is therefore decisive for the present measuring arrangement that the measuring cell itself is fastened at a ceramic ring, which preferably shows a thermal expansion coefficient adjusted to the measuring cell, and this ceramic ring in turn is fastened at a metal ring. The metal ring serves for fastening the arrangement in a process connection and is preferably also adjusted in its thermal expansion coefficient to the ceramic ring and preferably to the measuring cell.

The present arrangement provides a fastening of the measuring cell, which can easily be cleaned and is in particularly free from any dead space, which therefore can be particularly well used in processors of the food and pharmaceutical industry.

In one embodiment the measuring cell of the measuring arrangement can be embodied as a pressure measuring cell with a ceramic diaphragm, which is particularly advantageous for pressure measuring arrangements in which abrasion resistance of the arrangement is decisive.

The ceramic ring is preferably fastened via a solder connection to the measuring cell. A solder connection in the context of the present invention shall represent any adhesively joined connection using a fusible solder. Preferably the solder connection is generated via a hard solder or a glass solder, with the hard solder preferably representing one of the silver alloys AgCuTi3, AgCuTi-1, 8. Other potential solders are the alloys Ag, AgCu26Ti3 or AgCu46Ti6.

In particular, the glazing of the ceramic ring with a pressure measuring cell, using a glass solder, is considered advantageous because after the connection of the two components the glass solder shows a thermal expansion coefficient which is approximately equivalent to that of the ceramic pressure measuring cell and the ceramic ring. A glass solder connection is furthermore pressure-tight and diffusion-resistant so that it is excellently suited for the use in a pressure measuring cell. Another advantage of a glass solder connection is a lower processing temperature during the generation of the connection, compared to hard solder connections, for example.

In one embodiment the metal ring is arranged radially in reference to the ceramic ring.

This way an arrangement develops which, seen in the axial direction, shows a low structural depth and therefore, in cases in which it is decisive that the measuring cell can be arranged flush with the front for example, can be used preferably to the extent possible.

In one variant the metal ring is shrink-wrapped onto the ceramic ring, which in principle renders any additional mechanic connection between the metal ring and the ceramic ring unnecessary.

In another embodiment the metal ring is arranged axially in reference to the ceramic ring, so that an arrangement is generated which, seen in the axial direction, shows a greater structural depth; however, at its front side facing the process it can waive any seam between the anchoring and the metal. This is particularly advantageous because the metal-metal connections can be smoothed very well.

The metal ring and the ceramic ring can be connected to each other via a hard solder connection, for example. Such a hard solder connection is beneficial both in an axial as well as a radial arrangement of the metal ring in reference to the ceramic ring and can even additionally support a mechanic connection produced by shrink-wrapping the metal ring onto the ceramic ring.

In an axial arrangement of the metal ring in reference to the ceramic ring, the metal ring preferably shows an interior diameter which is equivalent to an interior diameter of the ceramic ring, with an exterior diameter of the metal ring being selected greater than an exterior diameter of the ceramic ring. The metal ring and the ceramic ring here abut flush with their respective interior diameter, with the metal ring of the ceramic ring projecting, seen in the radial direction. This way, a circumferential rim is formed in a particularly simple fashion, which can be used for a connection of the metal ring to the process connection, for example by way of welding.

The hard solder connection between the metal ring and the ceramic ring is preferably produced with a hard solder, preferably a silver-based solder. Silver-based solders with a low content of Cu particularly show improved stability in applications in an acidic or chloride-containing medium. The proportion of titanium in the solder influences the connection to the ceramic, with a proportion between 3% and 5% yielding particularly good results.

In one advantageous embodiment the ceramic ring is arranged with its front at the measuring cell. This is advantageous in particular in pressure measuring cells which show a diaphragm at their front, because a circumferential arrangement of the ceramic ring might potentially introduce stress into the measuring cell, acting in the radial direction, which during temperature fluctuations would result in a measuring result of the capacitively operating pressure measuring cell due to a distortion of the diaphragm caused by laterally introduced stress. The ceramic ring is preferably connected circumferentially to the measuring cell and preferably shows an exterior diameter which projects beyond the measuring cell in the radial direction.

In order to achieve the best possible thermal adjustment, the ceramic ring and the measuring cell are preferably made from the same material, preferably from aluminum oxide. Good thermal adjustment is achieved for the metal ring when it is produced, for example, from titanium or a titanium alloy. These materials additionally show good resistance to abrasions, so that a high mechanic stability of the arrangement can be achieved as well.

The arrangement according to the invention is resistant to high temperatures by avoiding elastomer gaskets and by using a ceramic measuring cell. Furthermore, no oxidizing materials are used here, so that an application in an oxygen environment is possible without any problems.

A method according to the invention for producing such a measuring arrangement is characterized in that in a first step the metal ring is connected to the ceramic ring and in a second step the ceramic ring is fastened at the measuring cell.

Preferably the metal ring and the ceramic ring are soldered to each other and/or the ceramic ring and the pressure measuring cell are glazed.

In a third step the metal ring can additionally be fastened in a process connection, preferably welded therein.

According to the invention the above-mentioned steps are processed in the above-listed sequence because this way particularly the increased heat input of a hard soldering process, by which the metal ring is preferably connected to the ceramic ring, can be performed independent from the measuring cell, and thus no negative thermal influences develop on it.

DETAILED DESCRIPTION OF THE FIGURES

FIG. 1 shows a schematic illustration of a measuring arrangement 1 according to the invention, with the measuring arrangement 1 being arranged via a process connection 5 in a flange 19. The process connection 5, which is produced from titanium or a titanium alloy for example, is welded circumferentially to the flange 19 and therefore generates a connection between the measuring arrangement 1 and the flange 19 which is pressure-tight and diffusion-resistant. In the process connection 5, a ceramic measuring cell 3 is fastened via a fastening arrangement 6, oriented in the direction of a process environment.

A housing 4 is arranged at the rear of the measuring cell 3 and the process connection 5, in which, for example, measuring electronics as well as input and output devices may be housed for the measuring arrangement.

FIG. 2 shows an enlarged detail of FIG. 1. In this enlarged detail, the arrangement of the measuring cell 3 in the process connection 5 and the fastening of the process connection 5 at the flange 19 are particularly clearly discernible.

The measuring cell 3 is held in the process connection 5 via the fastening arrangement 6, which in the present exemplary embodiment is formed by a ceramic ring and a metal ring arranged radially in reference to said ceramic ring.

In the axial direction, i.e. at the front, a ceramic ring 7 is circumferentially arranged at the measuring cell 3 in an edge region, which in the present exemplary embodiment, in which the measuring cell 3 is embodied as a pressure measuring cell, is placed circumferentially on a diaphragm 33 of the pressure measuring cell.

The ceramic ring 7 according to FIG. 2 shows an exterior diameter ka projecting beyond the measuring cell 3 in the radial direction.

In this exemplary embodiment the ceramic ring 7 is glazed via a solder connection 11, produced via a glass solder, to the measuring cell 3. A metal ring 9 is arranged circumferentially in reference to the ceramic ring, i.e. arranged in the radial direction. The metal ring 9 and the ceramic ring 7 are soldered to each other via a hard solder connection 13, produced via a silver-based solder.

The metal ring 9 in turn is welded circumferentially to the process connection 5, forming a welded connection 15. This way, the ceramic measuring cell 3 is held via the ceramic ring 7 and the metal ring 9 in the process connection 5 and thus sits in a diffusion-resistant fashion and without a gasket in the process connection 5. The process connection 5 in turn is also circumferentially welded to the flange 19, so that here too a diffusion-resistant arrangement is generated without gaskets.

In the exemplary embodiment according to FIG. 2 the ceramic ring 7 and the metal ring 9 are preferably sized such that in an arrangement of the measuring cell 3 in the process connection 5 a frontally planar arrangement is achieved. This is particularly necessary in the fields of ultrapure pharmaceutical or food applications, because in these sectors any formation of gaps or recesses must be avoided to the extent possible.

FIG. 3 shows an alternative arrangement of the fastening arrangement 6, whereby the exemplary embodiment of the metal ring 9 shown in FIG. 3 is arranged oriented in the axial direction towards the ceramic ring 7 and thus towards the process environment. In this exemplary embodiment the ceramic ring 7 is also placed in the axial direction, i.e. with its front on the diaphragm 33 of the measuring cell 3, in case of a pressure measuring cell preferably with its front at its diaphragm 33.

In the present exemplary embodiment the ceramic ring 7 shows an exterior diameter ka, which is equivalent to the exterior diameter of the measuring cell 3, i.e. that the ceramic ring 7 and the measuring cell 3 end flush at the outside, seen in the radial direction. Similar to the exemplary embodiment according to FIG. 2, the ceramic ring 7 is connected to the measuring cell 3 via a solder connection, which is generated by a glass solder.

The metal ring 9 according to the exemplary embodiment in FIG. 3 shows an interior diameter mi equivalent to an interior diameter ki of the ceramic ring 7. The ceramic ring 7 and the metal ring 9 therefore end flush at the inside in the radial direction 10 so that any formation of edges or gaps is avoided in this area in any case.

The metal ring 9 additionally shows an exterior diameter ma, which is greater than an exterior diameter ha of the anchoring ring 7. Therefore, the metal ring 9 projects beyond the anchoring ring 7 in the radial direction such that a circumferential edge is formed, which can be used, for example, in order to seal the metal ring 9 with the process connection 5.

An axial arrangement of the metal ring 9 in reference to the ceramic ring 7 offers the opportunity that this way an additional bonding seam towards the process environment can be avoided and a planar surface of the metal ring 9 as well as the front of the process connection 5 can be easily achieved. In particular, the welded connection 15 between the metal ring 9 and the process connection 5 as well as the welded seam 17 between the process connection 5 and the flange 19 can be smoothed well, so that in this area a planar surface is generated.

Figure 4:
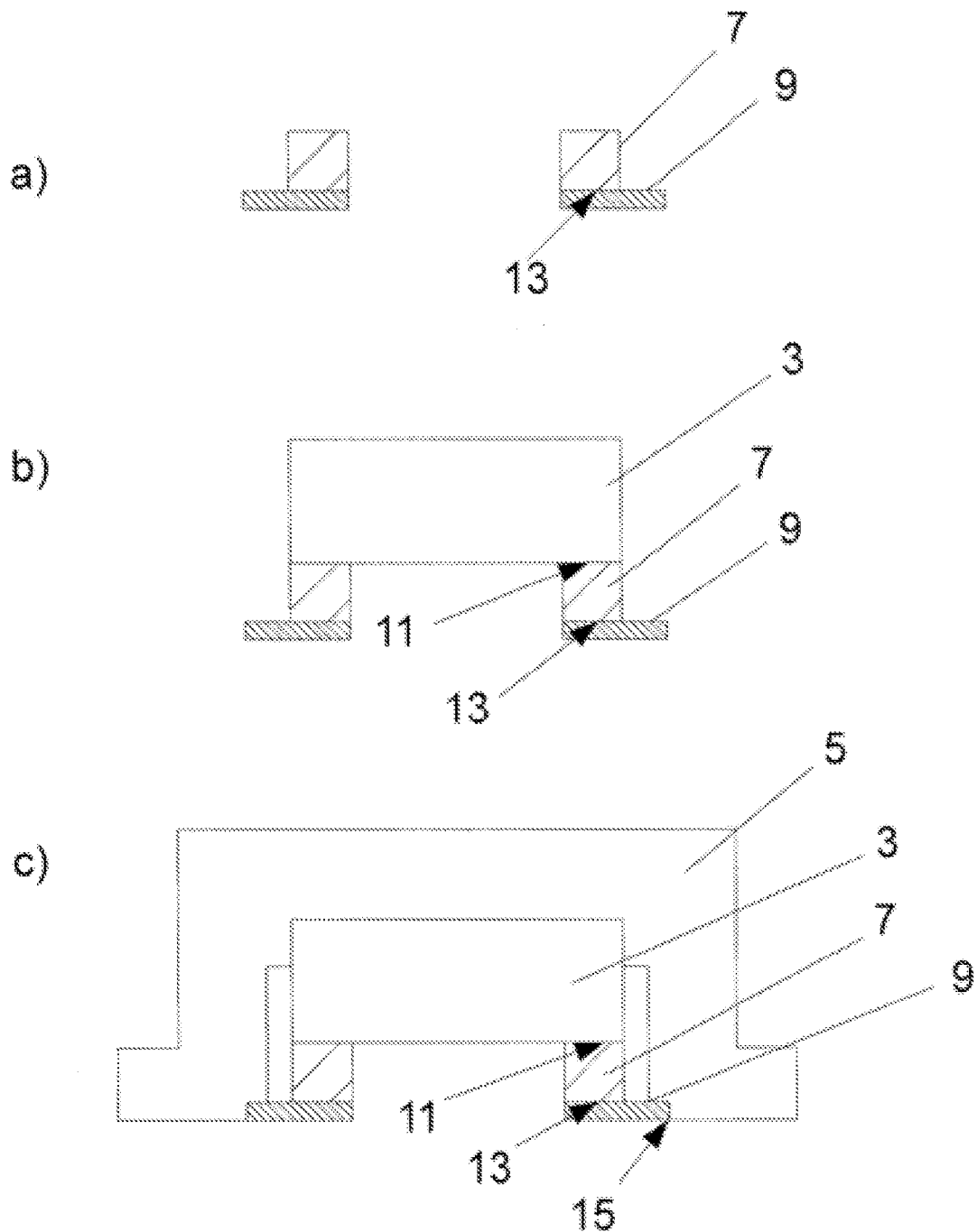
FIG. 4 is a line drawing evidencing the process of a method according to the invention.

FIG. 4 illustrates the process of the method according to the invention, in which in a first step a, the metal ring 9 and the ceramic ring 7 are connected via a hard solder connection 13. In a second step b, the ceramic ring 7 is connected to a measuring cell 3 via a solder connection, preferably a glass solder connection 11. This way particularly a temperature introduction necessary to generate the hard solder connection 13 is generated at a point of time at which no negative influences are expected upon the measuring cell 3.

The overall arrangement comprising the measuring cell 3, the ceramic ring 7, and the metal ring 9 is subsequently arranged in a third step c in the process connection 5 and connected thereto via a welded connection 15. Preferably both the measuring cell 3 and the ceramic ring 7 are made from the same material, for example aluminum oxide. The metal ring 9 and the process connection 5 are also both preferably produced from the same material, for example titanium.

LIST OF REFERENCE NUMBERS

1 Measuring arrangement
3 Measuring cell
4 Housing
5 Process connection
6 Fastening arrangement
7 Ceramic ring
9 Metal ring
11 Solder connection
13 Hard solder connection
15 First welded connection
17 Second welded connection
19 Flange
31 Measuring cell body
33 Diaphragm
ki Interior diameter of the ceramic ring
ka Exterior diameter of the ceramic ring
mi Interior diameter of the metal ring
ma Exterior diameter of the metal ring
a First step
b Second step
c Third step The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

I claim:

1. A measuring arrangement comprising a ceramic measuring cell and a metallic process connection for connecting the ceramic measuring cell to a measuring environment, wherein the ceramic measuring cell is fastened in the process connection without gaskets and in a diffusion-resistant fashion, and wherein the measuring cell is fastened to a ceramic ring, which ceramic ring is arranged at a metal ring and fastened to the process connection, wherein the metal ring is arranged axially in reference to the ceramic ring, and wherein the metal ring shows an interior diameter which is equivalent to an interior diameter of the ceramic ring and shows an exterior diameter which is greater than an exterior diameter of the ceramic ring, wherein the ceramic ring is fastened at the measuring cell with a solder connection, wherein the metal ring is connected with a hard solder connection to the ceramic ring, and wherein the ceramic ring is arranged with its front side at the measuring cell.

2. The measuring arrangement of claim 1, wherein the measuring cell is embodied as a pressure measuring cell with a ceramic diaphragm.

3. The measuring arrangement of claim 1, wherein the solder connection is generated with a hard solder or a glass solder.

4. The measuring arrangement of claim 1, wherein the solder is generated with a hard solder and the hard solder is a silver-based solder.

5. The measuring arrangement of claim 4, wherein the hard solder connection is produced with a silver-based solder.

6. The measuring arrangement of claim 1, wherein the ceramic ring and the measuring cell are made from the same material, preferably aluminum oxide.

7. The measuring arrangement claim 1, wherein the metal ring is made from titanium or a titanium alloy.

8. A method for producing a measuring arrangement of claim 1, comprising a first step (a) wherein the metal ring is connected to the ceramic ring and a second step (b) wherein the ceramic ring is fastened at the measuring cell.

9. The method of claim 8, wherein the metal ring is soldered to the ceramic ring and/or the ceramic ring is glazed to the measuring cell.

10. The method of claim 8, further comprising wherein the metal ring is fastened in a third step (c) in a process connection.

11. The method of claim 10, wherein the fastening of step (c) is accomplished by welding.

* * * * *